United States Patent
Kulka et al.

(10) Patent No.: US 10,284,115 B2
(45) Date of Patent: May 7, 2019

(54) INVERTER SYSTEM

(71) Applicant: Eltek AS, Drammen (NO)

(72) Inventors: Arkadiusz Kulka, Kristiansand S (NO); Kjetil Boysen, Flekkerøy (NO)

(73) Assignee: Eltek AS, Drammen (NO)

( * ) Notice: Subject to any disclaimer, the term of this patent is extended or adjusted under 35 U.S.C. 154(b) by 283 days.

(21) Appl. No.: 15/119,406

(22) PCT Filed: Feb. 25, 2015

(86) PCT No.: PCT/EP2015/053900
§ 371 (c)(1),
(2) Date: Aug. 17, 2016

(87) PCT Pub. No.: WO2015/128359
PCT Pub. Date: Sep. 3, 2015

(65) Prior Publication Data
US 2017/0063254 A1    Mar. 2, 2017

Related U.S. Application Data

(60) Provisional application No. 61/946,487, filed on Feb. 28, 2014.

(30) Foreign Application Priority Data

Feb. 28, 2014    (GB) .................................. 1403560.4

(51) Int. Cl.
H02J 3/00        (2006.01)
H02M 7/68        (2006.01)
(Continued)

(52) U.S. Cl.
CPC ................. *H02M 7/68* (2013.01); *H02J 3/32* (2013.01); *H02J 3/383* (2013.01); *H02J 3/46* (2013.01);
(Continued)

(58) Field of Classification Search
USPC ........................................................ 307/82
See application file for complete search history.

(56) References Cited

U.S. PATENT DOCUMENTS 8,373,303 B1    2/2013  Daniels et al.
2012/0002450 A1  1/2012  Mueller
(Continued)

FOREIGN PATENT DOCUMENTS

EP    2362519 A2    8/2011
WO    2012098709 A1  7/2012

OTHER PUBLICATIONS

International Search Report issued in corresponding application No. PCT/EP2015/053900 dated Jun. 10, 2015 (3 pages).
(Continued)

*Primary Examiner* — Fritz M Fleming
*Assistant Examiner* — Dru Parries
(74) *Attorney, Agent, or Firm* — Osha Liang LLP

(57) ABSTRACT

An inverter system includes an input inverter including a positive and a negative DC input terminals and first and second AC output terminals; and a bidirectional inverter device, including a first bidirectional subinverter and a second bidirectional subinverter. The first and second bidirectional subinverters have DC terminals that are interconnected in parallel with a DC power storage device. The first bidirectional subinverter have first and second AC terminals. The first AC terminal is connected to the first AC output terminal of the input inverter. The second bidirectional subinverter have first and second AC terminals. The first AC terminal is connected to the second AC output terminal of the input inverter. The second AC terminal of the first bidirectional subinverter and the second AC terminal of the second bidirectional subinverter are interconnected.

17 Claims, 3 Drawing Sheets

(51) Int. Cl.
*H02J 3/38* (2006.01)
*H02M 7/81* (2006.01)
*H02J 3/32* (2006.01)
*H02J 7/35* (2006.01)
*H02M 7/797* (2006.01)
*H02M 7/49* (2007.01)
*H02S 40/32* (2014.01)
*H02J 3/46* (2006.01)

(52) U.S. Cl.
CPC .............. *H02J 7/35* (2013.01); *H02M 7/49* (2013.01); *H02M 7/797* (2013.01); *H02M 7/81* (2013.01); *H02S 40/32* (2014.12); *Y02E 10/563* (2013.01); *Y02E 10/566* (2013.01); *Y02E 70/30* (2013.01)

(56) References Cited

U.S. PATENT DOCUMENTS

| | | | |
|---|---|---|---|
| 2012/0134189 A1 | 5/2012 | Krein | |
| 2013/0201736 A1 | 8/2013 | Chiang et al. | |
| 2014/0252863 A1* | 9/2014 | Patel | H02J 3/44 307/82 |

OTHER PUBLICATIONS

Written Opinion of the International Searching Authority issued in corresponding application No. PCT/EP2015/053900 dated Jun. 10, 2015 (6 pages).

Search Report issued by the Intellectual Property Office of the United Kingdom for corresponding application No. GB1403560.4 dated Sep. 12, 2014 (5 pages).

\* cited by examiner

INVERTER SYSTEM

TECHNICAL FIELD

The present invention relates to conversion of electric power, and in particular to an inverter system.

BACKGROUND

There is a world-wide increasing request for electric power. Due to climate and environmental concerns and shortage of natural resources, there is a particular demand for new and improved solutions for utilizing renewable energy resources in production of electric power.

Photovoltaic power generators, such as solar cell panels, provide DC power with time-varying magnitude, depending on location, time of day, weather conditions, etc. There is a general need for improved technology that converts the time-varying outputs of such power generators to regular, steady AC power, suitable to be consumed by normal power consuming devices and to be connected to common AC grids.

An inverter system may be used to increase symmetry in a network with unsymmetrical loads.

Inverter systems for such applications exist. Usually, such existing inverter systems make use of transformers, in particular autotransformers, for isolation and/or balancing purposes. The use of transformers involves reduced power efficiency and increased size and cost.

Hence there is a need for an improved inverter system.

SUMMARY

Advantages over background art are provided by an inverter system.

In one aspect, an inverter system in accordance with embodiments of the invention includes an input inverter including a positive and a negative DC input terminals and first and second AC output terminals; a bidirectional inverter device, including a first bidirectional subinverter and a second bidirectional subinverter; the first and second bidirectional subinverters having DC terminals that are interconnected in parallel with a DC power storage device; the first bidirectional subinverter having first and second AC terminals, the first AC terminal being connected to the first AC output terminal of the input inverter; the second bidirectional subinverter having first and second AC terminals, the first AC terminal being connected to the second AC output terminal of the input inverter; the second AC terminal of the first bidirectional subinverter and the second AC terminal of the second bidirectional subinverter being interconnected.

Additional features, principles and advantages of the invention will be recognized from the detailed description below. It is to be understood that both the foregoing general description and the following detailed description are exemplary and explanatory only and are not restrictive of the invention, as claimed.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

The invention will be described by exemplary embodiments in the following detailed description, with reference to the drawings.

Figure 1:
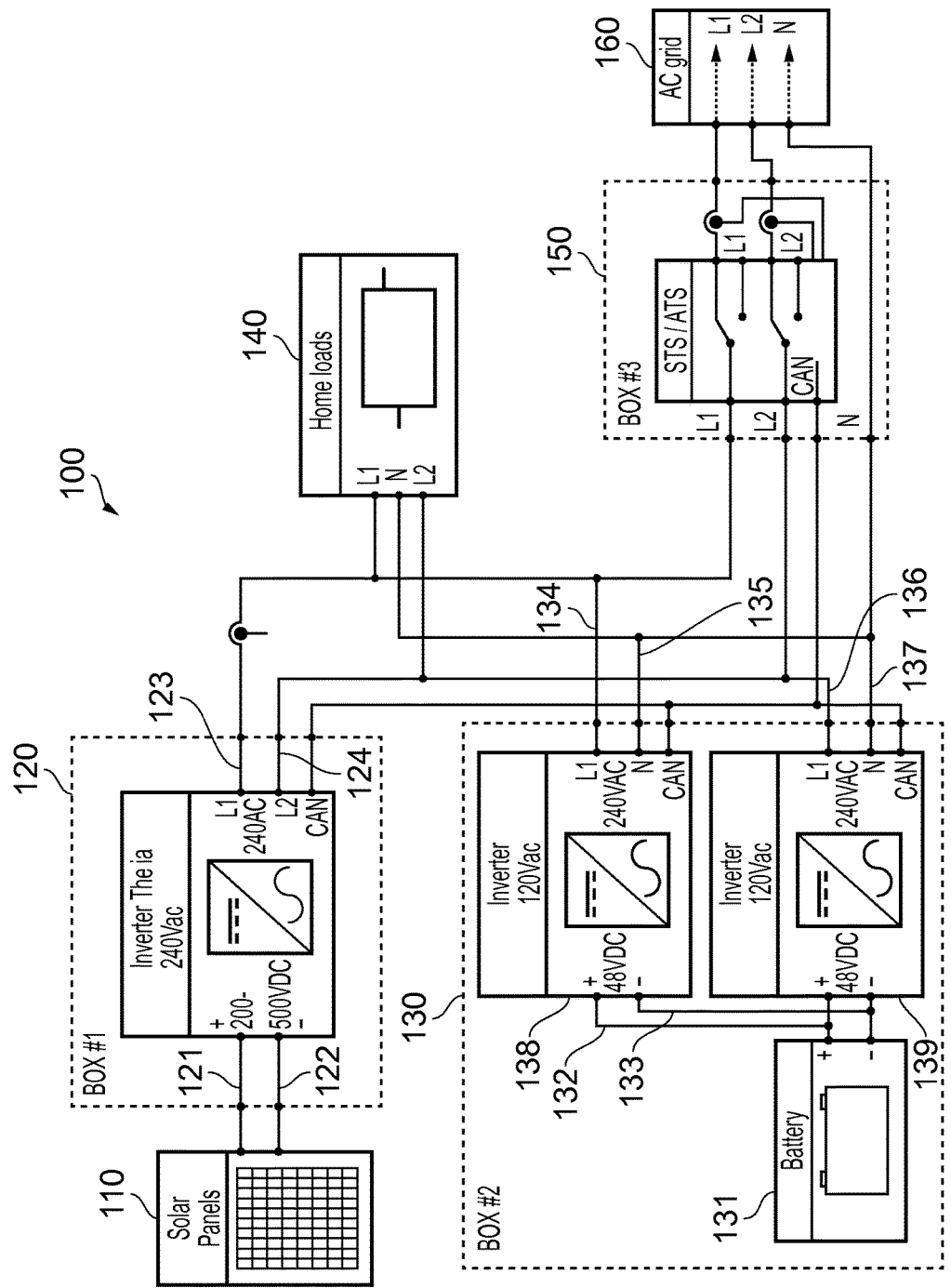
FIG. 1 is a schematic block diagram illustrating principles of an inverter system

FIG. 1 is a schematic block diagram illustrating principles of an inverter system 100.

A DC power generating device has been illustrated at 110. The DC power generating device 110 may advantageously be a source of renewable electric power. To this end, the DC power generating device 110 may include a photovoltaic power generator. As an example, the DC power generating device 110 may be a solar panel or a group of solar panels.

The DC power generating device 110 includes positive and negative DC output terminals that are connected to corresponding positive and negative DC input terminals 121, 122 respectively, of an input inverter 120. The input inverter 120 also has a first AC output terminal 123 and a second AC output terminal 124. The input inverter 120 may be any circuit suitable for transforming DC power at its DC input terminals 121, 122 into AC power at its output terminals 123, 124. The input inverter 120 may be current controlled, i.e. operating im current controlled mode.

Advantageously, the input inverter is also provided with a communication bus interface CAN, which enables communication and control of the input inverter 120 when interconnected with other units configured to operate by corresponding communication bus interfaces. As an example, the communication bus interface may be an interface of a message based, serial bus such as the CAN bus, although alternatives exist. For instance, the communication may use wireless connection, and the communication may optionally be extended to external networks, including the Internet, by means of suitable bridge(s), switch(es), router(s) and/or similar network devices.

The inverter system 100 further includes a bidirectional inverter device 130. The bidirectional inverter device 130 includes a first bidirectional subinverter 138 and a second bidirectional subinverter 139.

The bidirectional inverter device 130 is capable of transferring energy in either direction; either from the DC side (at the left in FIG. 1) to the AC side (at the right in FIG. 1), or from the AC side to the DC side. The bidirectional inverter device 130 may be selectably configured to operate in voltage controlled mode or current controlled mode.

The first 138 and second 139 bidirectional subinverters have DC terminals 132, 133 that are interconnected in parallel with a DC power storage device 131. The positive terminals of the bidirectional subinverters 138, 139 and the positive terminal of the DC power storage device 131 are interconnected at 132. The negative terminals of the bidirectional subinverters 138, 139 and the negative terminal of the DC power storage device 131 are interconnected at 133.

Each bidirectional subinverter 138, 139, may also be provided with a communication bus interface CAN, which enables communication with other interconnected units configured to operate by corresponding communication bus interfaces. As an example, the communication bus interface may be an interface of a message based, serial bus such as the CAN bus, although alternatives exist. As already mentioned, the communication may further be extended to external networks, including the Internet.

The DC power storage device 131 may include a rechargeable electrochemical accumulator, e.g., a rechargeable battery. Numerous types of rechargeable batteries may be used.

The first bidirectional subinverter 138 has first 134 and second 135 AC terminals. The first AC terminal 134 is connected to the first AC output terminal 123 of the input inverter 120.

The second bidirectional subinverter 139 has first 136 and second 137 AC terminals. The first AC terminal 136 is connected to the second AC output terminal 124 of the input inverter 120.

The second AC terminal 135 of the first bidirectional subinverter 138 and the second AC terminal 137 of the second bidirectional subinverter 139 are interconnected.

In an advantageous aspect of the inverter system 100, the connection between the first AC terminal 134 of the first bidirectional subinverter 138 and the first AC output terminal 123 of the input inverter 120 may form a first AC line connection L1.

Further, the connection between the first AC terminal 136 of the second bidirectional subinverter 139 and the second AC output terminal 124 of the input inverter 120 may form a second AC line connection L2.

Also, the connection between the second AC terminal 135 of the first bidirectional subinverter 138 and the second AC terminal 137 of the second bidirectional subinverter 139 may form an AC neutral connection N.

In another advantageous aspect of the inverter system 100, the input inverter 120 may have a nominal operating AC output voltage which is substantially twice or $\sqrt{3}$ times a nominal operating AC voltage of each of the first and second bidirectional subinverters. More specifically, the nominal operating AC output voltage of the input inverter 120 may be in the range 200 to 420 V rms, may be 220 to 250 V rms, for instance 240 V rms, and the nominal operating AC voltage of each of the first 138 and second 139 bidirectional subinverters may be in the range 100 to 240 V rms, may be 110 to 125 V rms, for instance 120 V rms.

In any of the disclosed aspects of the inverter system 100, the input inverter 120, the first bidirectional subinverter 138 and the second bidirectional subinverter 139 may advantageously be communicatively interconnected by a communication bus CAN.

In any of the disclosed aspects of the inverter system 100, the first L1 and second L2 AC line connections may advantageously be connected to corresponding switches in a transfer switch device 150. This configuration allows the first L1 and second L2 AC line connections to be switchably connected to an external AC grid 160. Also, the AC neutral connection N may advantageously be connected to the external AC grid 160.

When a transfer switch 150 is provided in the inverter system 100, the transfer switch 150 may also be configured to communicate by a communication bus CAN. In this case the communication bus CAN may communicatively interconnect the input inverter 120, the first bidirectional subinverter 138, the second bidirectional subinverter 139 and the transfer switch device 150.

In any of the disclosed aspects of the inverter system 100, the first L1 and second L2 AC line connections and the AC neutral connection N may be connected to a local power load 140.

In any of the disclosed aspects of the inverter system 100, the first subinverter 138 and the second subinverter 139 may operate in opposite phase (i.e. displaced with) 180°. Alternatively, they the first subinverter 138 and the second subinverter 139 may be controlled to operate with another phase displacement depending on the AC system configuration, the phase may for example be displaced with 120°.

A solar power supply system may include an inverter system 100 as specified in any aspect of the above disclosure. The solar power supply system may further include an array of photovoltaic power generators 110, such as a solar panel, and a DC power storage device (or rechargeable battery) 131.

Each of the bidirectional subinverters 138, 139 may be configured to operate in current controlled mode when connected to the AC grid 160 through the transfer switch device 150.

Each of the bidirectional subinverters 138, 139 may be configured to operate in voltage controlled mode when disconnected from the AC grid 160 by means of the transfer switch device 150.

The inverter system 100 may operate in either of an on-grid mode and an island mode. On-grid mode refers to the regular situation when the inverter system 100 is tied to the AC grid 160, while island mode refers to the situation when the inverter system 100 is disconnected from the AC grid 160.

In on-grid mode, the transfer switch 150 is closed and provides direct connections between the inverters' AC side interconnections and the AC grid 160. Further in on-grid mode, the input inverter 120 operates in on-grid current controlled mode. It feeds and converts energy from the DC power source 110 via the input inverter 120 to the AC grid 160. The energy provided by the DC source via the input inverter 120 may also be fed to to the local power load 140 and/or via the bidirectional inverter device 130 to the DC power storage device 131. Further, in on-grid mode, the bidirectional inverter device 130 is connected to the AC grid 160 in on-grid current controlled mode. The bidirectional inverter device 130 may transfer and convert energy from the DC power storage device 131 to the AC grid 160 and/or to the local power load 140.

In island mode, the transfer switch 150 is open, isolating the AC grid 160 from the inverters' AC side interconnections. The input inverter 120 may disconnect during the transfer event. Alternatively, the input inverter 120 may not disconnect during the transfer event.

Further, in island mode, both the bidirectional subinverters 138, 139 included in the bidirectional inverter device 130 will be configured in voltage controlled mode. Each bidirectional subinverter 138, 139 will then produce a split phase voltage, resulting in an island grid voltage twice or $\sqrt{3}$ times the nominal operating AC voltage of each of the first and second bidirectional subinverters. Hence, the island grid voltage may be in the range 200-420 V rms, may be 220 to 250 V rms, for instance 240 V rms, when the nominal operating AC voltage of each of the first 138 and second 139 bidirectional subinverters are in the range 100-240 V rms, may be 110 to 125 V rms, for instance 120 V rms.

Further, in island mode, the input inverter 120 may still operate in current control mode, and is still connected to the bidirectional inverter device 130, thus continuing providing energy from the DC power source 110 to the island grid.

Further, in island mode, the bidirectional inverter device 130 may control the energy provided by the input inverter 110 by use of droop control.

Either the bidirectional inverter device 130 or the transfer switch 150 may provide a signal, communicated via the communication bus interface CAN to the input inverter 110, notifying the input inverter 110 that the inverter system 100 enters a local island mode.

The bidirectional inverter device 130 may be able to provide DC power to the DC power storage device 131, i.e., charging the battery, in the case where the input inverter produces excessive power compared to the connected load.

Aspects of the transfer between the on-grid mode and island mode may be depend on the communication on the communication bus interface CAN. Such aspects may be modified based on local regulations.

Figure 2A:
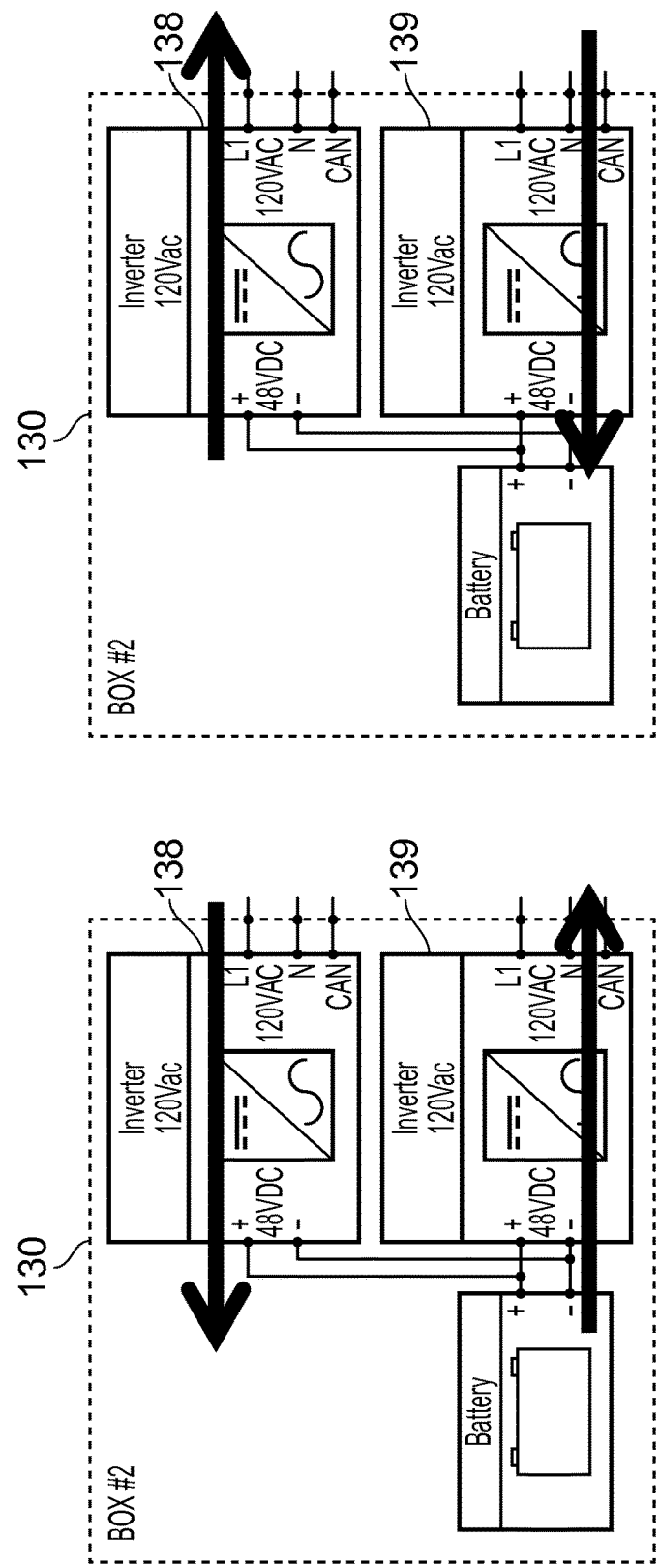
FIG. 2a-2c are schematic block diagrams illustrating various functionalities of operation of a bidirectional inverter device.
Figure 2C:
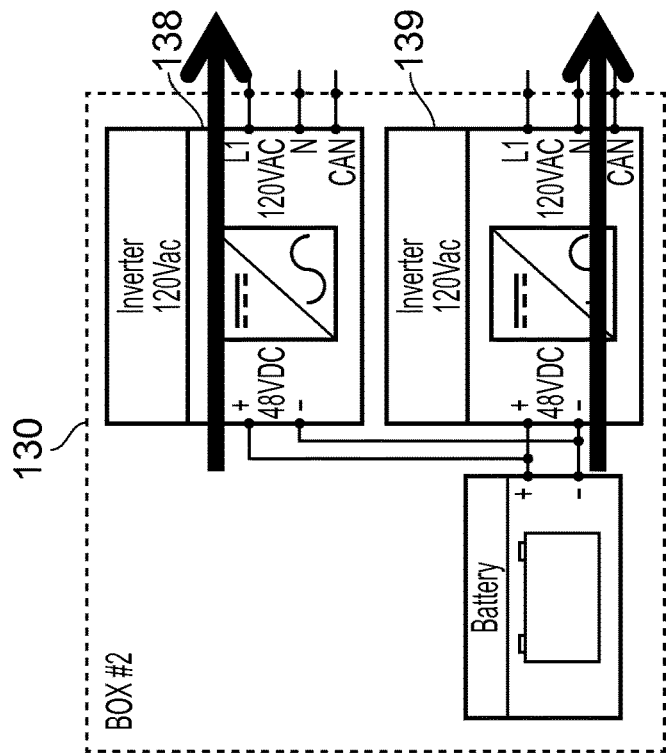
Figure 2B:
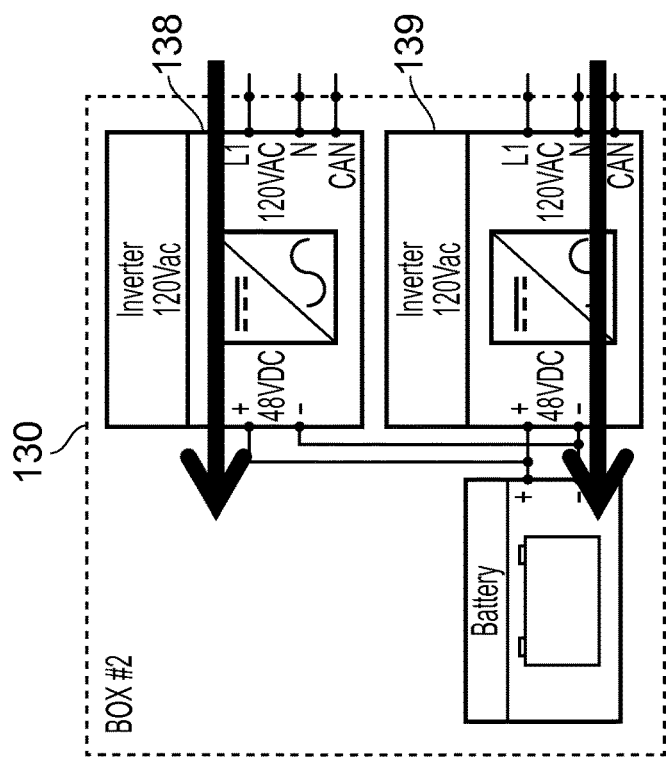

FIG. 2*a*-2*c* are schematic block diagrams illustrating various functionalities of operation of a bidirectional inverter device.

FIG. 2*a* illustrates a balancing functionality. To the left in FIG. 2*a* is it illustrated a situation wherein power is provided by the bidirectional inverter device 130, in particular the first bidirectional subinverter 138, to the DC power storage device 131. Hence, the battery is charged with one phase supply. The other phase supply, provided by the second bidirectional subinverter 139, is directed to the AC grid 160 or local load 140 or any combination of the load 140 and the grid AC grid 160.

The situation in FIG. 2*a* (left) could for example be used in a situation where the load connected between L1 and N of the home load 140 is much higher than the load connected between L2 and N of the home load 140, i.e. the load in the home load 140 is not symmetric. The power supply system 1 can here be used to compensate for this asymmetry by increasing the load connected between L2 and N by controlling the second subinverter 139 to draw AC power from L2 and convert it to DC, and in addition by controlling the first subinverter 138 to supply more power to L1.

To the right in FIG. 2*a* is it illustrated a situation wherein power is provided by the bidirectional inverter device 130, in particular the second bidirectional subinverter 139, to the DC power storage device 131. Hence, the battery is charged with one phase supply. The other phase supply, provided by the first bidirectional subinverter 138, is directed to the AC grid 160 or local load 140 or any combination of the load 140 and the grid AC grid 160.

FIG. 2*b* illustrates a charging functionality. Power is provided by the bidirectional inverter device 130, in particular from both the bidirectional subinverter 138 and the second bidirectional subinverter 139, to the DC power storage device 131. Hence, the battery is charged with both phase supplies.

FIG. 2*c* illustrates a supplying functionality. Power is provided by the DC power storage device 131 to the bidirectional inverter device 130, in particular to both the bidirectional subinverter 138 and the second bidirectional subinverter 139, and is directed to the AC grid 160 or local load 140 or any combination of the load 140 and the grid AC grid 160.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. An inverter system, comprising
an input inverter including a positive and a negative DC input terminals and first and second AC output terminals;
a bidirectional inverter device, including a first bidirectional subinverter and a second bidirectional subinverter;
the first and second bidirectional subinverters having DC terminals that are interconnected in parallel with a DC power storage device;
the first bidirectional subinverter having first and second AC terminals, the first AC terminal being connected to the first AC output terminal of the input inverter;
the second bidirectional subinverter having first and second AC terminals, the first AC terminal being connected to the second AC output terminal of the input inverter;
the second AC terminal of the first bidirectional subinverter and the second AC terminal of the second bidirectional subinverter being interconnected,
wherein the connection between the first AC terminal of the first bidirectional subinverter and the first AC output terminal of the input inverter forms a first AC line connection;
wherein the connection between the first AC terminal of the second bidirectional subinverter and the second AC output terminal of the input inverter forms a second AC line connection; and
wherein the connection between the second AC terminal of the first bidirectional subinverter and the second AC terminal of the second bidirectional subinverter forms an AC neutral connection.

2. The inverter system according to claim 1,
wherein input inverter has a nominal operating AC output voltage substantially twice or $\sqrt{3}$ times a nominal operating AC voltage of each of the first and second bidirectional subinverters.

3. The inverter system according to claim 2,
wherein the nominal operating AC output voltage of the input inverter is in the range 200-420 V rms, preferably 220 to 250 V rms, and the nominal operating AC voltage of each of the first and second bidirectional subinverters is in the range 100-240 V rms, preferably 110 to 125 V rms.

4. The inverter system according to claim 1,
wherein the input inverter, the first bidirectional subinverter and the second bidirectional subinverter are communicatively interconnected by a communication bus.

5. The inverter system according to claim 1,
wherein the first and second AC line connections are connected to corresponding switches in a transfer switch device, allowing the first and second AC line connections to be switchably connected to an external AC grid.

6. The inverter system according to claim 5,
wherein the AC neutral connection is connected to the external AC grid.

7. The inverter system according to claim 5,
wherein the input inverter, the first bidirectional subinverter, the second bidirectional subinverter and the transfer switch device are communicatively interconnected by a communication bus.

8. The inverter system according to claim 1,
wherein the first and second AC line connections and the AC neutral connection are connected to a local power load.

9. The inverter system according to claim 1,
wherein the positive and a negative DC input terminals of the input inverter are connected to a DC power generating device.

10. The inverter system according to claim 9,
wherein the DC power generating device is a source of renewable electric power.

11. The inverter system according to claim 10,
wherein the DC power generating device includes a photovoltaic power generator.

12. The inverter system according to claim 1,
wherein the DC power storage device includes a rechargeable electrochemical accumulator.

13. The inverter system according to claim 1,
wherein the first subinverter and the second subinverter operate in a different phase.

14. A solar power supply system,
comprising an inverter system as set forth in claim 1.

15. The inverter system according to claim 2,
wherein the input inverter, the first bidirectional subinverter and the second bidirectional subinverter are communicatively interconnected by a communication bus.

16. The inverter system according to claim 3,
wherein the input inverter, the first bidirectional subinverter and the second bidirectional subinverter are communicatively interconnected by a communication bus.

17. The inverter system according to claim 6,
wherein the input inverter, the first bidirectional subinverter, the second bidirectional subinverter and the transfer switch device are communicatively interconnected by a communication bus.

* * * * *